3,300,514
METHOD OF PREPARING 5-ALKYL-2-PYRROLIDONES
Gennady Ivanovich Nikishin, Moscow, and Ramis Ibragim Ogly Mustafaev, Baku, U.S.S.R., assignors to Institute Organicheskoi Khimii im. N.D. Zelinskogo, Moscow, U.S.S.R.
No Drawing. Filed Oct. 23, 1964, Ser. No. 406,168
1 Claim. (Cl. 260—326.5)

This invention relates to a method of preparing 5-alkyl-2-pyrrolidones used for manufacturing polymeric compounds which may, for example, be employed as adhesive cements.

In the prior art, 5-alkyl-2-pyrrolidones have been obtained by reacting aliphatic nitro compounds with methyl acrylate at a temperature of 60° C. in the presence of catalysts, followed by hydrogenation of the resultant nitro acid over a nickel catalyst, and cyclization.

The disadvantage of this method is that it involves several stages.

It is an object of the present invention to provide a single-stage procedure for the preparation of 5-alkyl-2-pyrrolidones.

Another object of the present invention is to provide a simplified procedure for the synthesis of 5-alkyl-2-pyrrolidones.

These objects are accomplished by a process which comprises reacting methyl acrylate and aliphatic amines at a temperature of 130 to 180° C. in the presence of a catalyst, viz., tert-butyl peroxide, the molar ratio of aliphatic amines, methyl acrylate and tert-butyl peroxide being 10–15:1:0.25 respectively.

The present invention makes possible the preparation of 5-alkyl-2-pyrrolidones by a relatively simple, single-stage procedure.

The process of the invention may be more readily understood from the following illustrative examples:

*Example 1.—Synthesis of 5-amyl-2-pyrrolidone*

A four-necked flask, equipped with a reflux condenser, stirrer, thermometer and a calibrated dropping funnel, is charged with 456 g. (4.5 moles) of hexylamine. To the hexylamine heated to the boiling point (131° C.) are added over a period of 6 hours, with stirring, 11 g. (0.075 mole) of tert-butyl peroxide dissolved in 25.8 g. (0.3 mole) of methyl acrylate. When all of the solution has been added, the reaction mixture is heated for 1.5 hours at 124° C. and then subjected to distillation which yields 10 ml. of peroxide decomposition products, 390 g. of hexylamine and 33.5 g. (72% yield) of 5-amyl-2-pyrrolidone, B.P. 139.5 141.5° C. (3 mm.); M.P. 36.5° C.

*Analysis.*—Found (percent): C, 69.80, 69.72; H, 10.96, 11.07. Calculated (percent): C, 69.63; H, 11.03.

*Example 2.—Synthesis of 5-nonyl-2-pyrrolidone*

Employing the procedure disclosed in Example 1, 157 g. (1 mole) of decylamine are reacted with 8.6 g. (0.1 mole) of methyl acrylate at a temperature of 150 to 155° C. in the presence of 3.65 g. (0.025 mole) of tert-butyl peroxide to give 17 g. (80% yield) of 5-nonyl-2-pyrrolidone, M.P. 58.5–59° C.

*Analysis.*—Found (percent): C, 73.70, 73.70; H, 11.84, 11.98. Calculated (percent): C, 73.87; H, 11.92.

Decylamine recovered from the reaction mixture (134 g.) is recycled.

What we claim is:

A method of preparing 5-alkyl-2-pyrrolidones which comprises reacting methyl acrylate with a primary alkylamine at a temperature of between 130 to 180° C. in the presence of tert-butyl peroxide as a catalyst, the methyl acrylate, alkylamine and tert-butyl peroxide being present in a molar ratio of 10 to 15:1:0.25 respectively, and thereafter recovering the obtained product.

No references cited.

ALEX MAZEL, *Primary Examiner.*

HENRY R. JILES, *Examiner.*

J. A. NARGAVAGE, *Assistant Examiner.*